A. B. LAWTHER.
Machine for Moistening Oleaginous Seeds.
No. 163,933. Patented June 1, 1875.
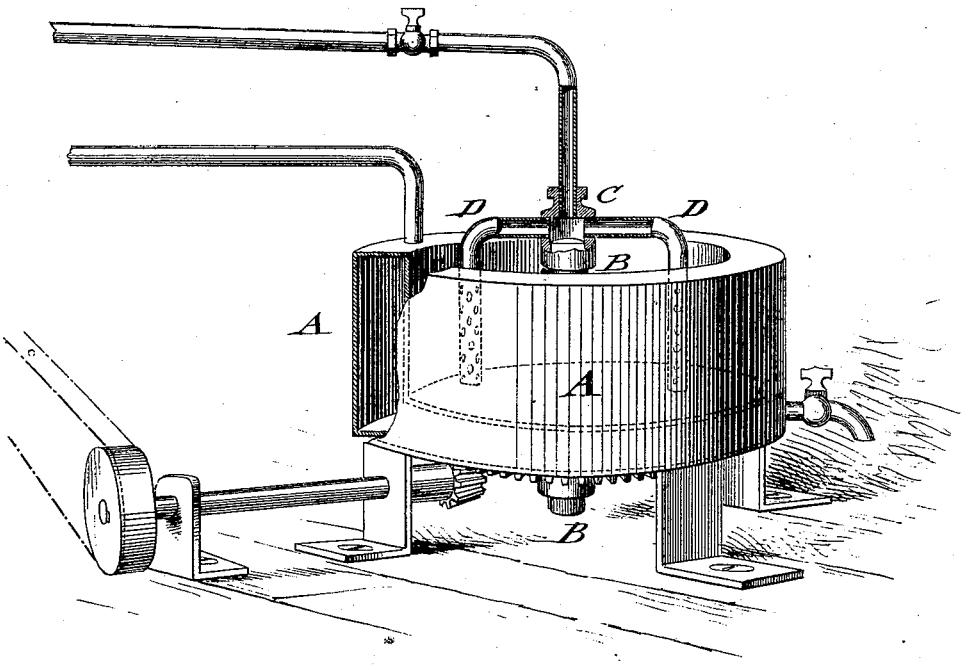
WITNESSES:
INVENTOR:
BY
ATTORNEYS.
THE GRAPHIC CO.PHOTO-LITH.39 & 41 PARK PLACE,N.Y.

UNITED STATES PATENT OFFICE.

ALFRED B. LAWTHER, OF CHICAGO, ILLINOIS.

IMPROVEMENT IN MACHINES FOR MOISTENING OLEAGINOUS SEEDS.

Specification forming part of Letters Patent No. 163,933, dated June 1, 1875; application filed March 6, 1875.

CASE B.

*To all whom it may concern:*

Be it known that I, ALFRED B. LAWTHER, of Chicago, in the county of Cook and State of Illinois, have invented a new and Improved Machine for Moistening Oleaginous Seeds, of which the following is a specification:

The accompanying drawing represents a perspective view partly in section of my improved machine for moistening oleaginous seeds preparatory to pressing the same.

My invention relates to a machine for mixing, moistening, and heating flaxseed, linseed, and other oleaginous seeds after they have been crushed, preparatory to putting the same into the presses; and the invention consists of a common or steam-heated reservoir arranged with one or more revolving perforated stirrer-arms, by which the seed is thoroughly mixed and moistened under the admission of hot or cold water or steam.

Hitherto the crushed and moistened seed was taken from the edge-runners and stirred thoroughly in a steam-jacket reservoir for heating and further mixing of the same preparatory to the pressing.

In the drawing, A represents a reservoir for the crushed seeds, arranged preferably with a steam-jacket for thoroughly heating the same therein during the mixing process. A central stirrer-shaft, B, is revolved by suitable gearing at the top or bottom of reservoir A, and provided with a head, C, having one or more perforated stirrers, D, extending down nearly to the bottom of reservoir A. The water or steam supply-pipe E is tightly set by suitable packing into the head C, and feeds the water or steam to the stirrer-arms from which it is thrown in small jets through the perforations into the mass of crushed seed, so as to thoroughly permeate the same simultaneously with the stirring action of the arms, fitting the mass thereby in a rapid, simple, and complete manner for the oil-presses.

Having thus described my invention, what I claim as new, and desire to secure by Letters Patent, is—

A machine for mixing, moistening, and heating oleaginous seeds, herein described, comprising a steam-jacketed reservoir or vessel, A, and hollow revolving perforated stirrer-arms D, as and for the purpose set forth.

ALFRED B. LAWTHER.

Witnesses:
JAMES WRIGHT,
CHARLES F. HILLS.